(12) United States Patent
Wong

(10) Patent No.: US 6,570,883 B1
(45) Date of Patent: May 27, 2003

(54) PACKET SCHEDULING USING DUAL WEIGHT SINGLE PRIORITY QUEUE

(76) Inventor: Hsiao-Tung Wong, 6170 Boar Cir., Fremont, CA (US) 94539

(*) Notice: Subject to any disclaimer, the term of this patent is extended or adjusted under 35 U.S.C. 154(b) by 0 days.

(21) Appl. No.: 09/385,247

(22) Filed: Aug. 28, 1999

(51) Int. Cl.[7] .......................... H04L 12/28; H04L 12/56
(52) U.S. Cl. .................... 370/412; 370/232; 370/395.4; 370/395.42
(58) Field of Search ............................... 370/230, 232, 370/233, 234, 235, 253, 352, 353, 354, 395.21, 395.4, 395.41, 395.42, 395.5, 395.71, 395.72, 412, 413, 415, 417, 395.43, 399, 416

(56) References Cited

U.S. PATENT DOCUMENTS

| | | | | |
|---|---|---|---|---|
| 5,499,238 A | * | 3/1996 | Shon | 370/399 |
| 5,541,919 A | * | 7/1996 | Yong et al. | 370/416 |
| 5,838,686 A | | 11/1998 | Ozkan | 370/433 |
| 5,978,374 A | * | 11/1999 | Ghaibeh et al. | 370/395.43 |
| 5,982,748 A | * | 11/1999 | Yin et al. | 370/232 |
| 5,999,534 A | * | 12/1999 | Kim | 370/395.42 |
| 6,018,527 A | * | 1/2000 | Yin et al. | 370/395.41 |
| 6,104,700 A | * | 8/2000 | Haddock et al. | 370/412 |
| 6,262,986 B1 | * | 7/2001 | Oba et al. | 370/399 |
| 6,324,165 B1 | * | 11/2001 | Fan et al. | 370/232 |
| 6,389,019 B1 | * | 5/2002 | Fan et al. | 370/395.42 |
| 6,438,134 B1 | * | 8/2002 | Chow et al. | 370/412 |

* cited by examiner

*Primary Examiner*—Douglas Olms
*Assistant Examiner*—Phirin Sam
(74) *Attorney, Agent, or Firm*—Chi Ping Chaug; Pacific Law Group LLP

(57) ABSTRACT

A packet scheduling system for a packet switching network is disclosed which supports quality of service features including real-time priority, bandwidth reservation and excess bandwidth sharing. A dual frame approach is used to control the bandwidth distribution among multiple traffic flows. Each traffic flow is temporarily stored in a first-in-first-out queue first. The time domain is divided into recurring Synchronous Frames, and Asynchronous Frames. The Synchronous Frames are fixed size frames. Concatenating discrete portions of contiguous Synchronous Frames form the Asynchronous Frame. The packet scheduler alternates between Synchronous Frame access and Asynchronous Frame access in transmitting the packets. During the Synchronous Frame access period, packets are transmitted using the corresponding traffic flow's available reserved bandwidth while during Asynchronous Frame access period, packets are transmitted using the corresponding traffic flow's available excess bandwidth. Synchronous Frame access always has higher priority than Asynchronous Frame access. Among those backlogged flow queues with available bandwidth credits, packets in the higher real-time priority flow queues are always transmitted before packets in the lower real-time priority flow queues. The Synchronous Frames and the Asynchronous Frames are controlled by separate mechanisms.

11 Claims, 13 Drawing Sheets

Figure 5. Packet Scheduler

PACKET SCHEDULING USING DUAL WEIGHT SINGLE PRIORITY QUEUE

BACKGROUND OF THE INVENTION

1. Field of the Invention

The present invention relates to a packet switching network. More particularly, it relates to a packet switching device having a queuing system and a packet scheduler that together handle the traffic control and bandwidth management to support guaranteed quality of service.

2. Related Background Art

IP based networks have evolved from supporting traditional best effort, data centric services to support multiple service grades, multi-media networking services. There is an increased need for the packet-based networks to provide guaranteed quality of service. Providing guaranteed quality of service in packet-based networks requires the use of a packet scheduling system consisting of a queuing system and a packet scheduler. The queuing system allows different traffic streams to receive different service-quality treatments from the scheduler. There are many different kinds of scheduling systems today that support different flavors of quality of service. A desirable scheduling system has the following attributes, which are also indicators for quality of service (Quality of Service"):

(1) "Bandwidth Utilization". The scheduling system must utilize bandwidth efficiently;

(2) "Traffic Flows Isolation". Each traffic flow is isolated from the undesirable effect of other flows;

(3) "Scalability". The scheduling system must support large number of traffic flows;

(4) "Real-time Priority". Traffic flows with higher real time requirements should be forwarded before traffic flows with lower real time requirements; and (5) "Fairness". Priority and fairness are conflicting factors, yet a good scheduling system achieves a balance between Fairness and Priority.

Existing scheduling systems may be strong in one or more of the above five aspects, but none has been perfect in all five aspects. Round robin based scheduler has good fairness property, but lacks real-time priority, and the bandwidth utilization is potentially poor. Yet a simple priority based scheduler does not provide fairness, which will result in starvation. There are scheduling algorithms that address Bandwidth Efficiency, Flow Isolation, Fairness and Scalability such as Weighted Fair Queuing, Weighted Round Robin, Frame-Based Fair Queuing, and Starting Potential-Based Fair Queuing. But these algorithms do not address real-time support and neither do they provide flexibility in sharing excess bandwidth.

There are a few algorithms that address Real-Time support, along with Bandwidth Efficiency, Flow Isolation, Fairness and Scalability. Class Based Queuing is one of such algorithms. However, the issues of sharing available bandwidth are still not addressed. Class Based Queuing takes a hierarchical scheduling approach to provide a traffic control mechanism using Weighted Fair Queuing or Weighted Round Robin for guaranteed resource sharing on the base level. On a second level, it groups the flows into different priority categories, so that the flows queues with the highest priority are always considered first to be provided for bandwidth. This priority is important for a networking device to support multiple streams of data with different real time requirements such as voice, interactive data, and file transfer.

For example, U.S. Pat. No. , 5,838,686 presents a scarce source allocating system as shown in FIG. 14 and FIG. 15 that can well illustrate Class Based Queuing. As illustrated by the block diagram of a multiplexer system in FIG. 14, all signal paths are illustrated as single signal lines which however could carry multibit digital signals, either in parallel, in which case the signal paths would be composed of multiple signal lines, or serially, in which case the signal paths could be a single data line and/or include a data and clock signal line. A plurality of input terminals 5 are coupled to sources (not shown) of video signals (CHANNEL 1–CHANNEL K) which are to be transmitted together over a data link. The plurality of input terminals 5 are coupled to respective data input terminals of a plurality of corresponding channel processors 10. Respective data output terminals of the plurality of channel processors 10 are coupled to corresponding data input terminals 1–K of a multiplexer (MUX) 20. A data output terminal of the multiplexer 20 is coupled to an output terminal 15 of the multiplexer system. Output terminal 15 is coupled to utilization circuitry (not shown) for transmitting the multiplexed data stream over the transmission link.

Each of the plurality of channel processors 10 further includes a complexity output terminal and a control input terminal. The respective complexity output terminals of each of the plurality of channel processors are coupled to corresponding complexity input terminals of a bit rate allocator 30, and respective quota output terminals of the bit rate allocator 30 are coupled to the corresponding control input terminals of the plurality of channel processors 10.

In operation, each channel processor receives a signal at its control input terminal representing the bit rate allocated to it for the next quota period. The channel processor then encodes the signal at its data input terminal for the next quota period into a digitally encoded signal at the allocated bit rate. The encoded data signal is supplied to the corresponding input terminal of the multiplexer 20. The multiplexer 20 operates in a known manner to combine the signals from all the channel processors into a multiplexed data stream. The multiplexed data stream is then supplied to the circuitry comprising the data link for transmission, also in a known manner.

During the encoding process, the channel processor 10 generates a signal at its complexity output terminal representing the coding complexity of the signal being encoded. The bit rate allocator 30 receives the signals from the complexity output terminals of the channel processors 10, and, based on all of the complexity signals, dynamically adjusts the bit rate quotas for the next quota period among the plurality of channel processors 10. More complex signals are dynamically allocated at a relatively higher bit rate than less complex signals. Different methods of determining the complexity of the video signal and for allocating bit rates based on the complexities are described below.

FIG. 15 is a block diagram of a channel processor which may be used in the multiplexer system illustrated in FIG. 14. In FIG. 15, elements similar to those in FIG. 14 are designated by the same reference number. In FIG. 15, a data input terminal 5 is coupled to a video signal source (not shown). Data input terminal 5 is coupled to a data input terminal of a constant bit rate encoder (CBR) 14, and a complexity analyzer 16. A data output terminal of the CBR encoder 14 is coupled to an input terminal of the multiplexer (MUX) 20 (of FIG. 14). A control input terminal (CONTROL) of the channel processor 10 is coupled to a quota input terminal Q of the CBR encoder 10. An output terminal of the complexity analyzer 16 is coupled to the complexity output terminal (COMPLEXITY) of the channel processor 10.

In operation, the complexity analyzer 16 analyzes the complexity of the video signal at the data input terminal 5. A signal is produced at the output terminal of the complexity analyzer 16 representative of the complexity of the input signal. The complexity representative signal is supplied to the bit rate allocator 30 (of FIG. 14). In response to this complexity signal (and those of the other channel processors 10), the bit rate allocator 30 provides a signal to the control input terminal (CONTROL) of this channel processor 10 (and the other channel processors 10) representing the bit rate allocated to this channel processor 10. The CBR encoder 14 is an encoder which compresses and encodes a video signal in accordance with a standard promulgated by the Moving Picture Expert Group (MPEG), termed an MPEG encoder. The CBR encoder 14 provides a data path between its data input and data output terminals for producing an output signal encoded at a constant bit rate. The constant bit rate is set in response to the signal at the quota input terminal Q from the control input terminal (CONTROL) of the channel processor 10 from the bit rate allocator 30.

Although Class Based Queuing provides better quality of service support, it nevertheless has limitations in its application. First, since Class Based Queuing scheduling is using a hierarchical link-sharing model, real-time priority is supported by addition of a scheduling layer on top of the leaf, this may introduce efficiency trade off. Further, it is difficult to separate out the excess bandwidth sharing from resource reservation. This limits the flexibility of excess bandwidth sharing. The excess bandwidth sharing is a desirable feature in today's packet based network, in that most of the existing network applications still assume best effort based network services. It is not practical for a File Transfer session to estimate it's bandwidth requirement and make a claim for it. The more practical approach is to allocate a portion of bandwidth to be shared by sessions such as File Transfer which need not reserve a fixed portion of bandwidth, and assigned a priority level for each session sharing the pre-served bandwidth.

Secondarily, Class Based Queuing regulates user traffic only when the out going link is congested. In the hierarchical link-sharing model, since the lower level nodes do not have actual knowledge of the overall load on the outgoing link, they have to rely on approximations for link sharing guideline. This results in additional computational overhead, inefficiency in resource utilization, or unfairness.

The present invention is motivated by the interest in finding out alternative solutions to offer the desired Quality of Service features previously described.

SUMMARY OF THE INVENTION

The present invention relates to a switching device in a packet switching network. The switching device takes a number of input packet flows and transmit them to the outgoing link. Since the capacity of the outgoing link may not always be able to transmit all the input packet flows at the same time, the switching device need to queue the input packet flows and schedule them to be feed to the outgoing link. The quality of service of the switching network is then depend on how the switching device handle the packet flows to best utilize the resources to transmit all the packet flows with speed and quality. The switching device has a queuing system and a packet scheduler, that are handling the queuing and scheduling respectively. Their performance is thus key to the improvement of the network's quality of service.

The present invention provides an innovated packet scheduling system for a packet switching device to better support the quality of service. The packet scheduling system consists of a queuing system, which isolates the input packet flow from one another and a scheduling system named packet scheduler, which runs a scheduling algorithm to allocate bandwidth to the packet flows. One aspect of the present invention is to define a set of service parameters for each flow to indicate different aspects of the quality of service and consumption of resource. These parameters are defined as follows: (1) "Real Time Priority" shall mean that the packets in a higher real time priority traffic flow are processed earlier than the packets in a lower real time priority traffic flow; (2) "Reserved Bandwidth" shall mean that the bandwidth committed by the scheduling system to the traffic flow; and (3) "Excess Bandwidth Priority" shall mean a weighting factor for the traffic flow in sharing the excess bandwidth.

Another aspect of the present invention is to use multiple First-In-First-Out packet queues in the queuing system to meet potentially different Quality of Service requirements for different traffic flows. A traffic flow is referred to as a stream of packets that receives the same forwarding treatment by the network. It can be a voice session between two parties, or a file transfer session between a client and file server, or an aggregated stream of multiple sessions between two networks. Each packet queue, or flow queue, is associated with one or more traffic flows. The following set of parameters are attributed to each packet queue according to the invention: (1) "Maximum Reserved Bandwidth Credit" or "MRBC" shall correspond to the flow queue's share of reserved bandwidth; (2) "Available Reserved Bandwidth Credit" or "ARBC" shall mean an auxiliary variable for a flow queue used to keep track of the traffic flow's bandwidth usage and a non-empty flow queues with positive ARBC is ready to be processed by the scheduler; (3) "Maximum Excess Bandwidth Credit" or "MEBC" shall correspond to the flow queue's share of excess bandwidth; (4) "Available Reserved Bandwidth Credit" or "ARBC" shall mean an auxiliary variable for each flow queue used to keep track of a traffic flow's excess bandwidth usage in that a non-empty flow queues with positive AEBC is ready to be processed by the scheduler; and (5) "Real Time Priority" shall decide among that backlogged flow queues with available bandwidth credit, which flow queue is processed first.

Yet another aspect of the present invention is to use a dual-frame approach in the packet scheduler to allocate reserved bandwidth and excess bandwidth for each flow queue. In this approach, the time domain is divided into recurring fixed size Synchronous Frames; concatenating discrete portions of contiguous Synchronous Frames forms the Asynchronous Frames. Synchronous Frame is accessed by transmitting packets from a backlogged flow queue using the flow queue's ARBC, and Asynchronous Frame is accessed by transmitting packets from a backlogged flow queue using the flow queue's AEBC. To allocate reserved bandwidth, each traffic flow's ARBC is initialized to its MRBC at the beginning of a Synchronous Frame. When a packet is transmitted from a backlogged flow queue using the flow queue's reserved bandwidth, its ARBC is subtracted an amount proportional to the packet size. A flow queue with negative ARBC is not eligible for Synchronous Frame Access. The packet scheduler uses a sorted priority queue, the Synchronous Priority Queue (SPQ), to maintain those backlogged flow queues with positive ARBC. The SPQ is sorted in decreasing order of real time priority. When a flow queue with positive ARBC becomes backlogged, it is put in the SPQ, and when a flow queue in the SPQ consumed all its ARBC or becomes empty, it is removed from the SPQ.

To control the Synchronous Frame, a routine is executed at each clock tic, which increment its internal count each time. When its internal count reaches the count for the size of the Synchronous Frame, the end of a Synchronous Frame is detected, and its internal tic count is reset to zero. At the beginning of every Synchronous Frame, all the packet queues' available reserved bandwidth credits are compensated up to their MAC. After the compensation, if a nonempty packet queue has positive ARBC and is not in the SPQ is put back to the SPQ.

In dealing with excess bandwidth allocation, each traffic flow's share of excess bandwidth is translated into its MEBC in a Asynchronous Frame period, and its AEBC corresponds to its available excess bandwidth in that Asynchronous Frame Period.

The packet scheduler accesses the Asynchronous Frame by transmitting packets from a backlogged flow queue using the flow queue's share of excess bandwidth. During the Asynchronous Frame access, each time a packet is transmitted from a flow queue, the flow queue's AEBC is subtracted an amount proportional to the packet size. A flow queue with negative AEBC is not eligible for Asynchronous Frame Access. The packet scheduler uses a sorted priority queue, the Asynchronous Priority Queue (APQ), to keep those backlogged flow queues with positive AEBC. The APQ is sorted in decreasing order of real time priority. When a flow queue with positive AEBC becomes backlogged, it is put in the APQ, and when a flow queue in the APQ consumed all its AEBC or becomes empty, it is removed from the APQ.

The Asynchronous Frame restarts when no backlogged priority queue has positive AEBC. Every time an Asynchronous Frame restarts, each flow queue is compensated up to its MEBC worth of AEBC. After the compensation, if a nonempty packet queue has positive AEBC and is not in the APQ is put back to the APQ.

The Synchronous Frame Access always has a priority than Asynchronous Frame Access. The packet scheduler continues to access the SPQ until the SPQ becomes empty, then the packet scheduler begins to access the APQ. After a packet is transmitted from a flow queue in the APQ, the packet scheduler immediately switches over to the SPQ if the SPQ is not empty.

The uses of SPQ and APQ are to support real time priority for each traffic flow. An alternative design to support real time priority is to use a Priority Control Block, which is an array of entries indexed by the real time priority. Each entry in the array contains two FIFO queues: the Synchronous Access Queue, which contains a list of backlogged flow queues with positive ARBC, and the Asynchronous Access Queue, which contains a list of backlogged flow queue with positive AEBC. A backlogged flow queue is put in the queues of the entry indexed by the flow queue's real timer priority. A bit mapped array can be used to keep track of the PCP entries containing non-empty queues. Since the PCB is implicitly sorted, the packet scheduler only needs to go to the entry corresponding to the location of the first bit in the bit mapped array that is set.

DETAIL DESCRIPTION OF THE INVENTION

Figure 1:
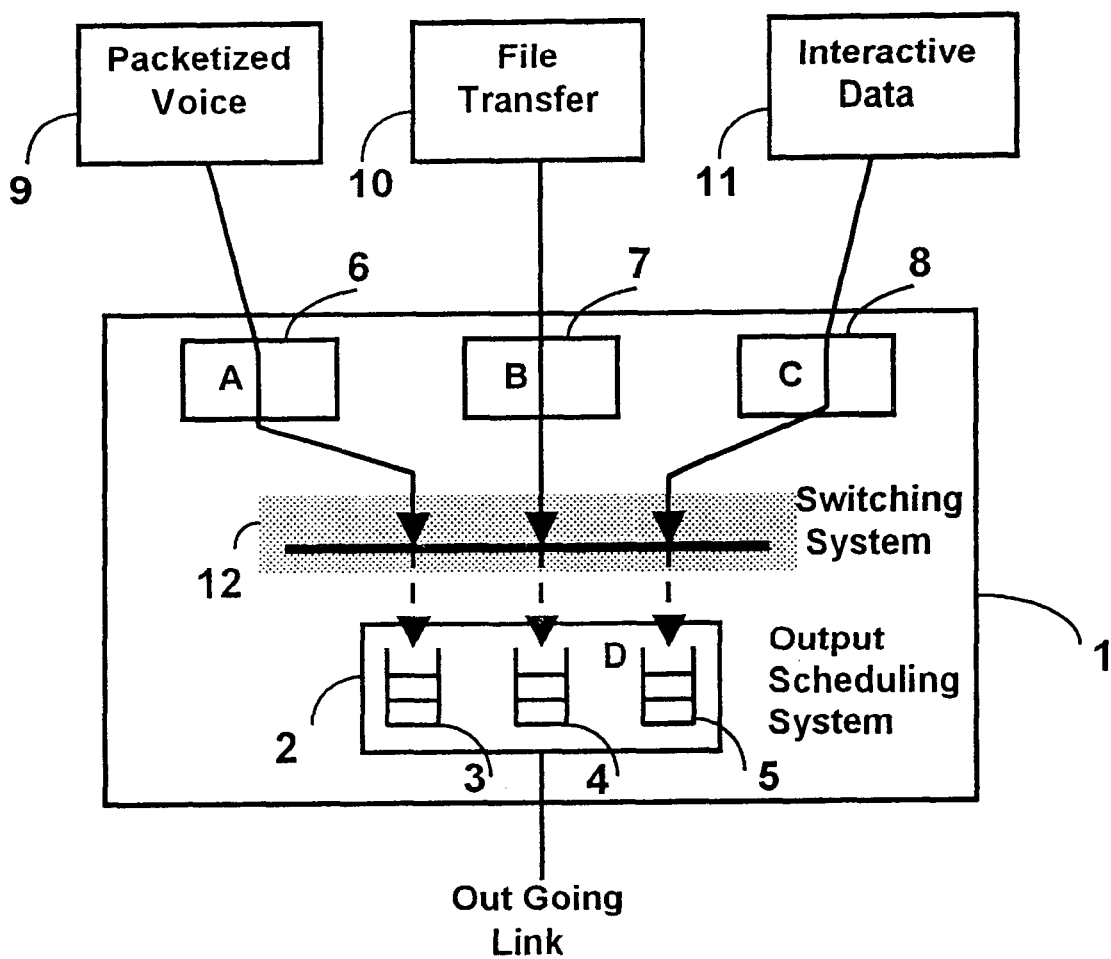
FIG. 1 illustrates an example of a concentrator or a gateway device according to the present invention.
Figure 2:
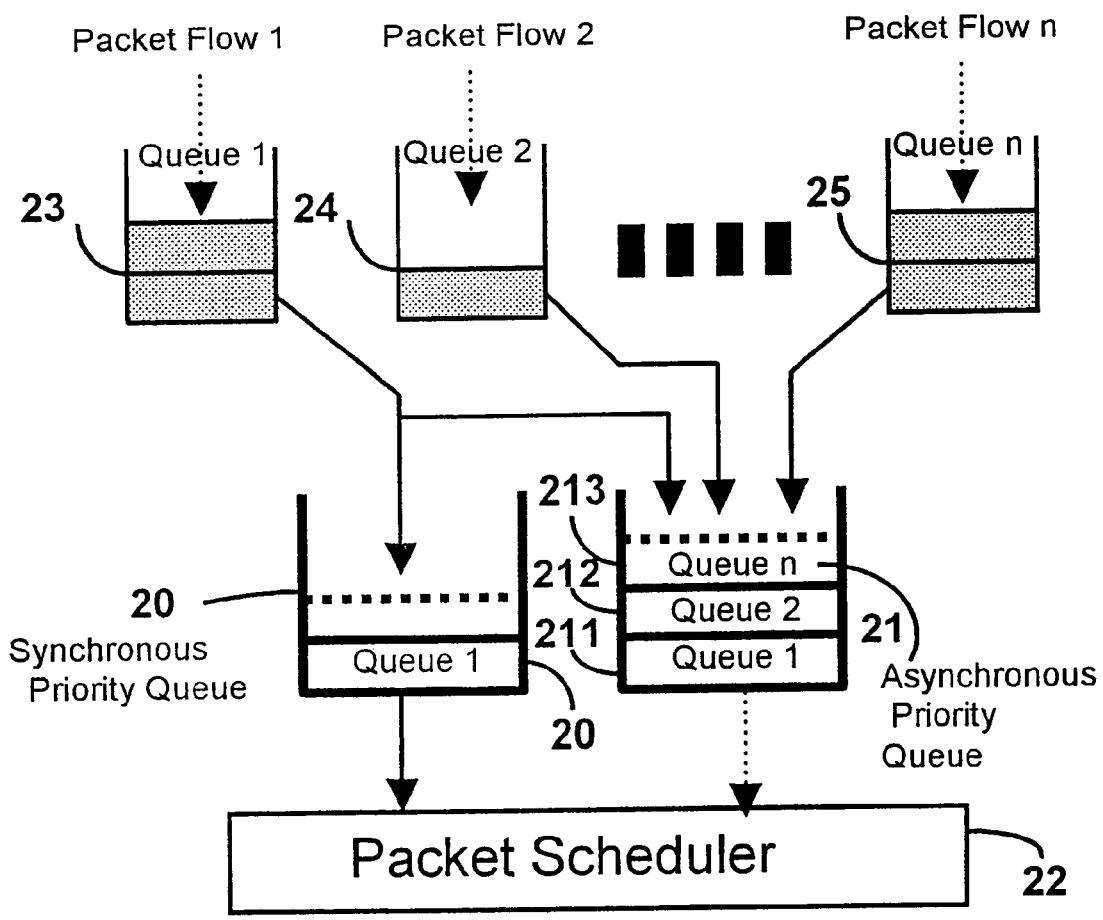
FIG. 2 illustrates the packet scheduler and queuing system in a packet scheduling system.

FIG. 1 illustrates an example of a port concentrator where the present invention can be applied. Numeral 9~11 represent input traffic flows each may have different quality of service requirements. In a typical situation, numeral 9 denotes a voice message packet flow, numeral 10 denotes a file transfer data packet flow and numeral 11 denotes an interactive data packet flow. Numeral 1 denotes a port concentrator that is going to take the input packet flows 9, 10 and 11. The port concentrator 1 has four ports that are denoted by numerals 2, 6, 7, 8 respectively. Port A denoted by numeral 6 is taking voice traffic 9, port B denoted by numeral 7 is taking file transfer traffic 10, and port C denoted by numeral 8 is taking interactive data traffic 11. Numeral 12 denotes a switching system that switches the three traffic flows came from port A 6, B 7 and C 8 and direct them to port D which is denoted by numeral 2. The packets for each flow are put in the queues denoted by numerals 3~5 in port D 2 waiting to be properly scheduled and sent out to the out going link. A scheduling system resides in port D2 schedules the outgoing packet flows according to their Quality of Service Requirements, their traffic rates, and the load of the outgoing link. FIG. 2 illustrates an example of a scheduling system residing in port D2. Numeral 23~25 denotes a plural of queues storing packet flows fed to port D2. Numeral 20 denotes a Synchronous Priority Queue. Numeral 21 denotes an Asynchronous Priority Queue. Original queues 23~25 are regrouped into the Synchronous Priority Queue(SPQ) 20 and the Asynchronous Priority Queue(APQ) 21 for scheduling purposes. Numeral 22 denotes a Packet Scheduler that takes packets from the Synchronous Priority Queue 20 and the Asynchronous Priority Queue 21 and schedule them to go through the outgoing link.

Several technical concepts need to be introduced here for the discussion of the scheduling algorithm. A new set of service parameters for each traffic flow are introduced in the present invention which are defined as follows:

"Real Time Priority" means that the packets in a traffic flow with higher real time priority are processed sooner than the packets in a traffic flow with lower real time priority.

"Reserved Bandwidth" means the bandwidth committed by the scheduling system to the traffic flow and is used as a service parameter defined for a traffic flow.

"Excess Bandwidth Priority" means a weighting factor for the traffic flow in sharing the excess bandwidth and is used as a service parameter defined for a traffic flow.

For the First-In-First-Out packet queues, or flow queues, each is associated with one or more traffic flow, there are following parameters defined for a packet or flow queue:

"Maximum Reserved Bandwidth Credit (MRBC)" means a parameter defined for a packet or flow queue that corresponds to the queue's share of reserved bandwidth.

"Available Reserved Bandwidth Credit (ARBC)" means an auxiliary variable parameter defined for a flow queue to keep track of the traffic flow's bandwidth usage. A non-empty flow queues with positive ARBC is ready to be processed by the scheduler.

"Maximum Excess Bandwidth Credit (MEBC)" means a parameter defined for a packet or flow queue that corresponds to the flow queue's share of excess bandwidth.

"Available Reserved Bandwidth Credit (AEBC)" means an auxiliary variable parameter defined for each flow queue to keep track of a traffic flow's excess bandwidth usage. A non-empty flow queues with positive AEBC is ready to be processed by the scheduler.

"Real Time Priority" means a parameter defined for a packet or flow queue to determine among backlogged flow queues with available bandwidth credit which flow queue is processed first.

Non-empty flow queues among original queues 23~25 are put in the SPQ 20 if they have positive ARBC, and in the APQ 21 if they have positive AEBC. The SPQ 20 is a queue of non-empty flow queues denoted by numeral 201 with positive ARBC sorted in decreasing order of real-time priority. The APQ 21 is a queue of non-empty flow queues with positive AEBC denoted by numerals 211, 212, 213 sorted in decreasing order of real-time priority. In our example here, Queue 1 has higher real-time priority than Queue 2, and Queue 2 has higher priority than Queue n.

The packet scheduler 22 consists of three independently threads of execution. The first thread handles all arriving packets, the second handles clock tics, and the third thread handles packet transmission from the selected flow queues.

Figure 3:
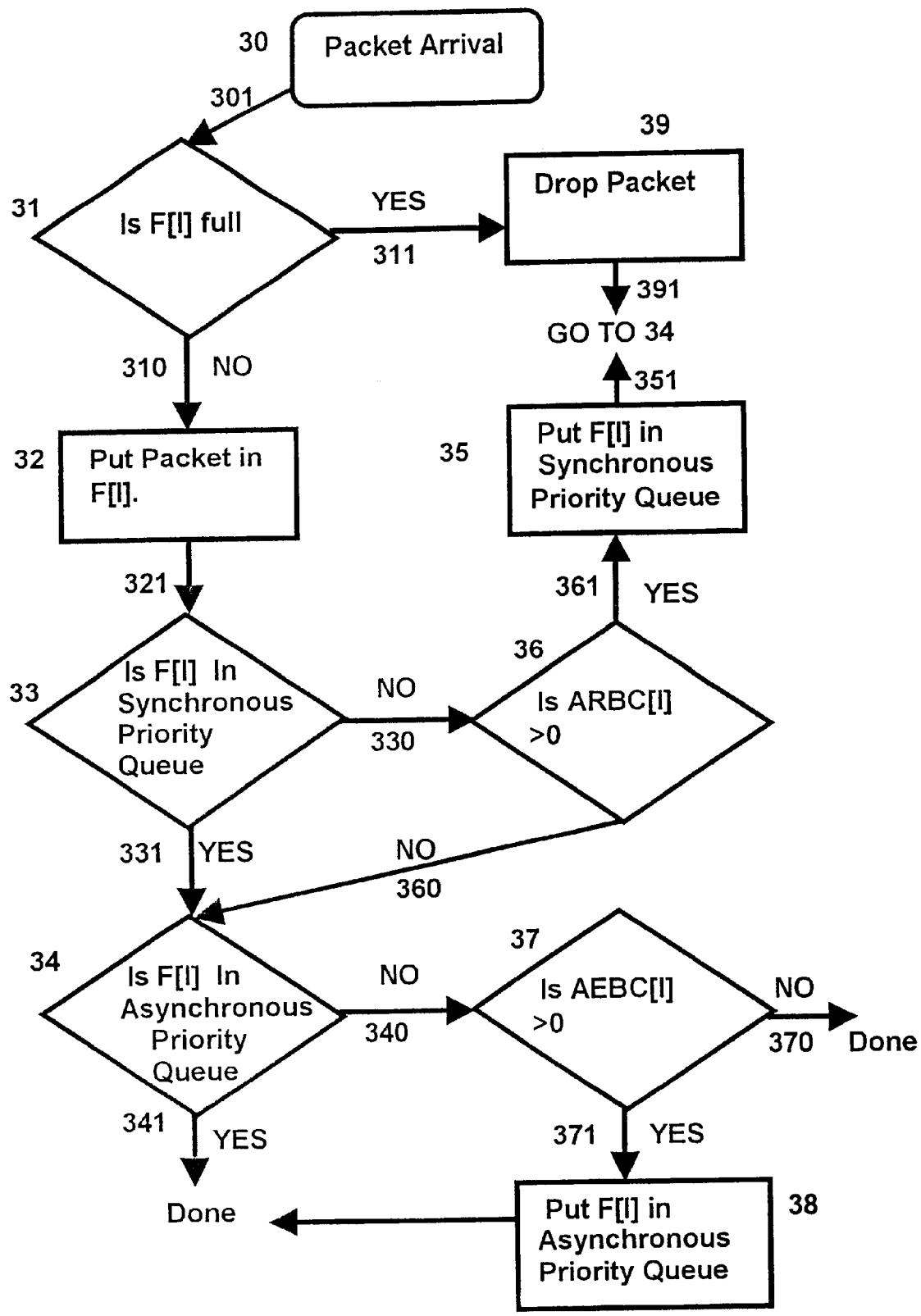
FIG. 3 illustrates how an arriving packet is handled by the scheduling system.

FIG. 3 presents a flow chart that illustrates the first thread in packet scheduler 22 which handles arriving packet. Numeral 30 denotes a flow queue F[I] where an arriving packet is to be stored. Line 301 directs the flow to a decision block denoted by numeral 31 to determine if flow queue F[I] is full. If the flow queue is full, then following line 311 to activity block 39 that the packet is to be dropped, otherwise the packet is stored in flow queue F[I] denoted by numeral 32.

Next, a check is to be done to see if the flow queue needs to be inserted into the SPQ. Decision block denoted by numeral 33 checks whether flow queue F[I] is already in the SPQ. If the answer is yes, follow line 331 to decision block 34 and begin the procedure to decide if the flow queue needs to be inserted into the APQ. If the answer is no, then line 330 is followed to a decision block denoted by numeral 36 where a check is done to see if it has positive ARBC. If the answer is no, again follow line 360 to a decision block 34. If the answer is yes, then following line 361, the flow queue is inserted into the SPQ in activity block denoted by numeral 35, and then follow line 351 to the decision block 34.

The decision block 34 starts another check to see if the flow queue needs to be inserted into the APQ. The decision block 34 checks whether flow queue F[I] is in the APQ, if it is already in the APQ then the operation is completed, otherwise follow line 340 to a decision block 37 to see if flow queue F[I] has positive AEBC. If the answer is no, operation is completed. If the answer is yes, then following line 371 to activity block 38 which inserts flow queue F[I] into the APQ.

The scheduler uses the Synchronous Frame to allocate reserved bandwidth for each backlogged traffic flow. As an example, assume there are N traffic flows (F[1], F[2]J, . . . F[N]) sharing the outgoing link, and the duration of a S byte long Synchronous Frame is T milliseconds, which makes the transmission rate of the system equals (S*1000)/T byte/sec. If the maximum sharable bandwidth in a frame period is represented by the Maximum Synchronous Frame Credit (MSFC) and traffic flow F[I]'s maximum available reserved bandwidth credit in a Synchronous Frame period, MRBC[I], is a fraction of MSFC, then the reserved bandwidth allocated to backlogged traffic flow F[I], Bwr [I], can be calculated as:

$$Bwr[I]=(MRBC[I]/MSFC)*((S,*1000)/T)$$

If MSFC equals to S, then Bwr[I] becomes:

$$Bwr[I]=(MRBC[I]*1000)/T$$

Figure 4:
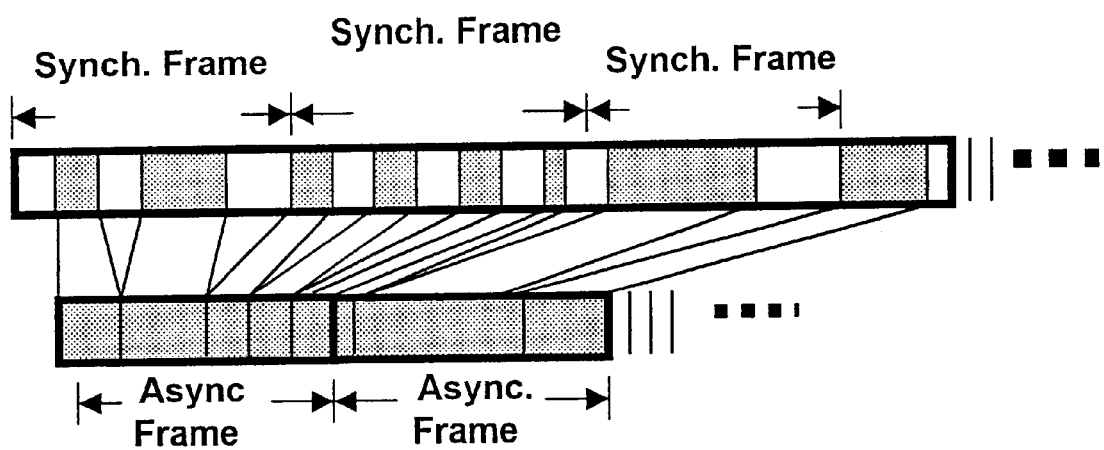
FIG. 4 illustrates the Synchronous Frames and Asynchronous Frames in the time domain.

The excess bandwidth allocation is based on the utilization of an Asynchronous Frame. As is illustrated in FIG. 4, an Asynchronous Frame spans over multiple Synchronous Frames. Those discrete portions in Synchronous Frame covered by the Asynchronous Frames are the time periods where no backlogged flow queue has positive ARBC. To calculate the excess bandwidth that each backlogged flow queue is allotted, assuming that traffic flow F[I]'s maximum available excess bandwidth credit is MAEB[I], then the excess bandwidth allotted to traffic flow F[I], Bwe[I] in a system where all flow queues are continuously backlogged can be calculated as:

$$Bwe[I] = \sum_{i=0}^{N}(MEBC[I]*(MSFC-(MRBC[I])*1000)/(MSFC*T)$$

The Bwe[I] in the above equation is calculated over m number of Synchronous Frames, where m equals:

$$m = \sum^{N} MSFC/(MSFC-(MRBC[i]))$$

Figure 5:
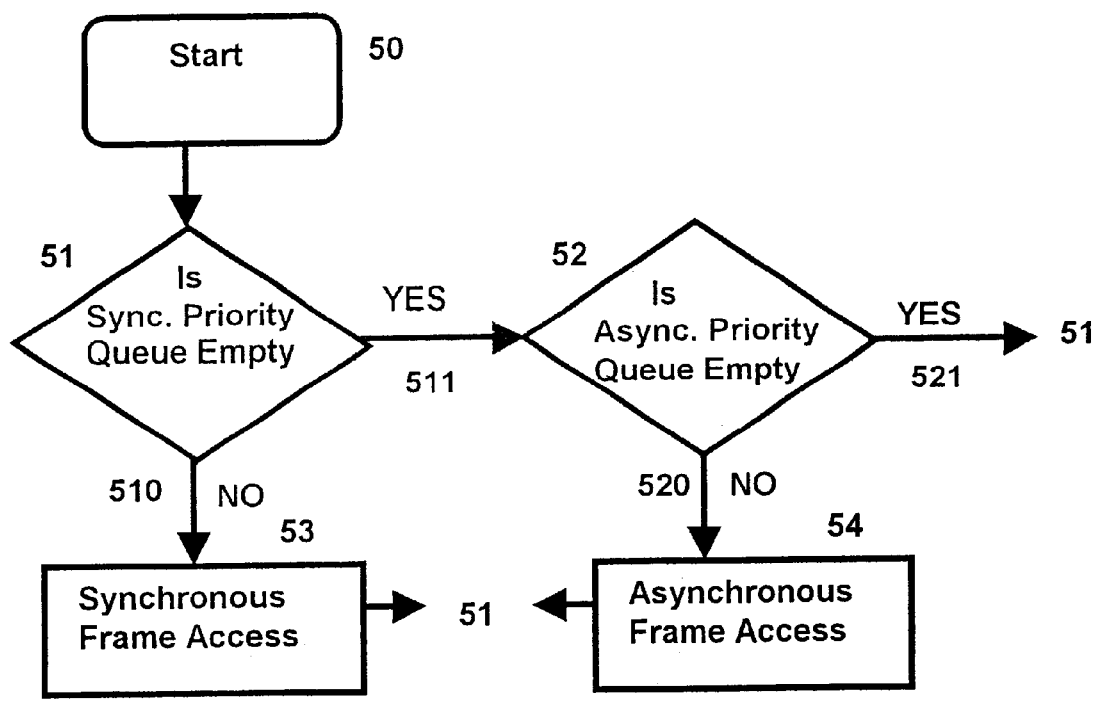
FIG. 5 illustrates the packet scheduler accesses Synchronous Frame and Asynchronous Frame to get packets out of the backlogged flow.

FIG. 5 is a flow chart that illustrates the packet dispatcher thread operation, the thread that handles packet transmission from the selected flow queues. In the processing loop, the dispatcher alternates between Synchronous Frame access and Asynchronous Frame access. A decision block 51 checks to see if SPQ is empty or not, if not empty, then following line 510 to the Synchronous Frame Access procedure denoted by a activity block 53, and back to a decision block 51 after done with Synchronous Frame Access procedure. Otherwise, following line 511 to decision block 52 to check on APQ's fill level. If the APQ is empty, go back to the decision block 51. If the APQ is not empty, then Asynchronous Frame Access Procedure denoted by activity block 54 is followed, and back to the decision block 51 after Asynchronous Frame Access Procedure is done. Each time the Asynchronous Frame Access is invoked, it only handles one packet from a backlogged flow queue, whereas once the Synchronous Frame access is invoked, it dose not stop until the SPQ is empty. Synchronous Frame Access Procedure and Asynchronous Frame Access Procedure will be explained in detail later along with FIG. 7 and FIG. 8.

Figure 6:
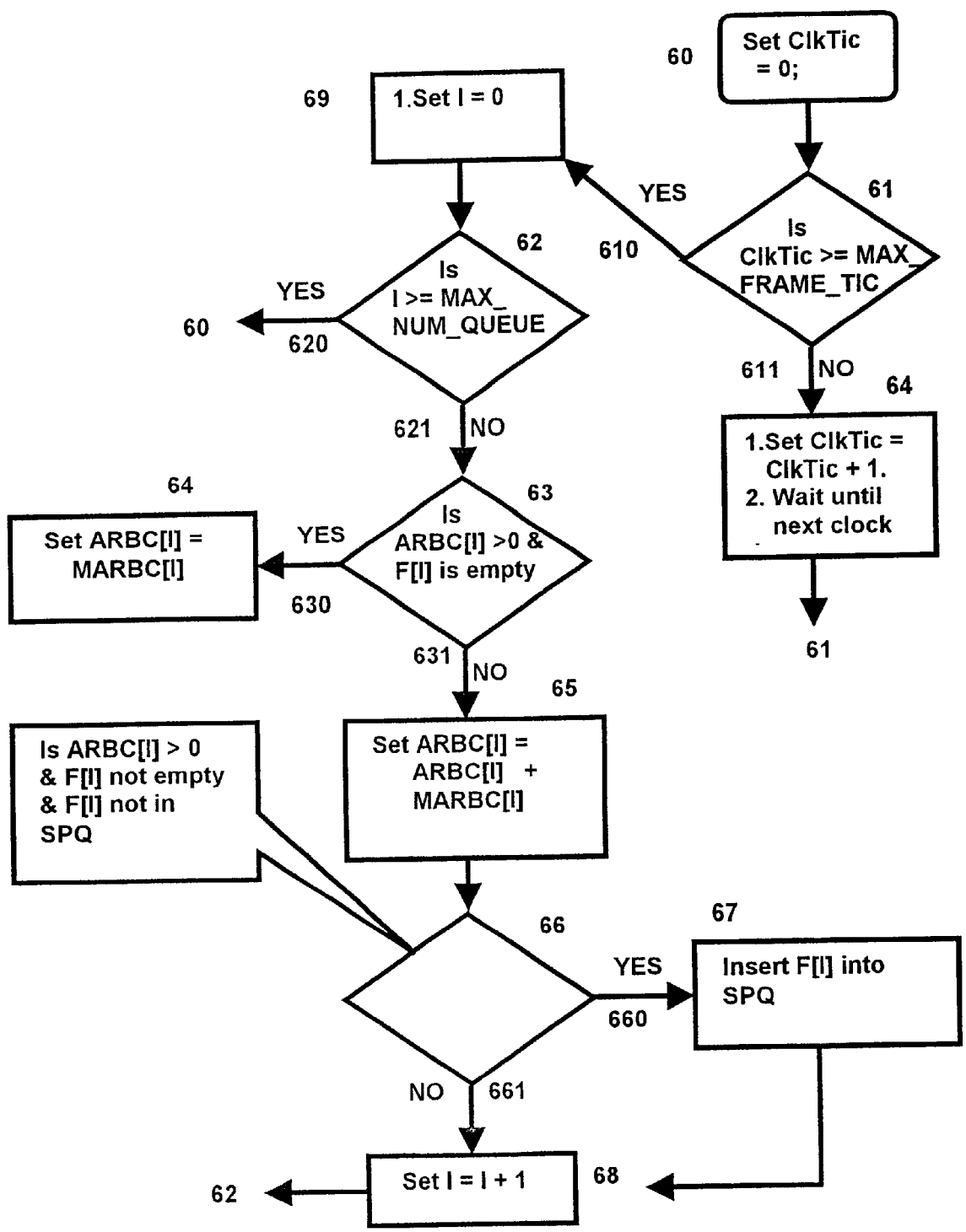
FIG. 6 illustrates the procedure that handles the clock tics.

FIG. 6 illustrates the clock tic procedure. The threads processing the clock tic is blocked waiting for the tic signal to occur. An auxiliary variable, ClkTic, is used to keep the current tic count. ClkTic is cleared in block 60 initially. Next a check to see if the ClkTic that has reached the maximum frame tic is done in a decision block 61. If the answer is yes, the follow line 610 to a block 69 which starts the Synchronous Frame restart procedure. Otherwise, ClkTic is incremented by one, and the execution thread waits until next clock tic before it goes back to the decision block 61.

The Synchronous Frame restart procedure consists of a loop to adjust every flow queue's ARBC, and possibly the SPQ contents. An auxiliary variable I is introduced to indicate which flow is being processed. If the total number of flows is $MAX_{13}NUM_{13}QUEUE$, and I=0 represent the first queue, I=1 represent the second queue, . . . , I=$MAX_{13}NUM_{13}QUEUE$-1 represent the last queue.

Synchronous Frame restart procedure starts from block 69, I is initialized to 0 which means the process is started with the first flow. A decision block 62 starts the loop to apply Synchronous Frame restart procedure to all flows by checking I to see if all flows have been exhausted. If I>=$MAX_{13}NUM_{13}QUEUE$ is true, then all flows have been referenced and go back to block 60. Otherwise, I still indicate one of the flows and go on to the decision block 63 to process that flow. For each flow queue I, a check is done to see if its ARBC is positive and if it is empty in the decision block 63. If the answer is yes, which means the flow is not backlogged, and because each traffic flow's bandwidth allocation is guaranteed up to its reserved amount only when the traffic flow is backlogged, the follow line 630 to block 64 to reset the flow queue's ARBC to its MARBC. If the answer is no, follow line 631, in which case the flow queue is still backlogged, or the flow queue is allocated more than what the respective traffic flow has reserved in the last frame period, the flow queue's ARBC is compensated by its MARBC in block 65. Since packets are of variable sizes, it is possible that the traffic flow's bandwidth consumption goes beyond the boundary of its associated flow queue's ARBC in a Synchronous Frame period. This results in a negative ARBC. This flow queue's over allocation is factored into in the next frame period where every flow queue's ARBC is re-adjusted. This case is handled in step 65. After adjusting the flow queue's ARBC, a check is done to see if the flow queue has a positive ARBC and is not in the SPQ in block 66. If so, then the flow queue is inserted into SPQ in block 67. This results in all backlogged flow queues which exhausted their ARBC in the last frame period, being re-inserted back to the SPQ again to be processed by the packet scheduler. Then I is incremented by 1 in block 68 and go back to block 62 to begin processing next flow.

Figure 7:
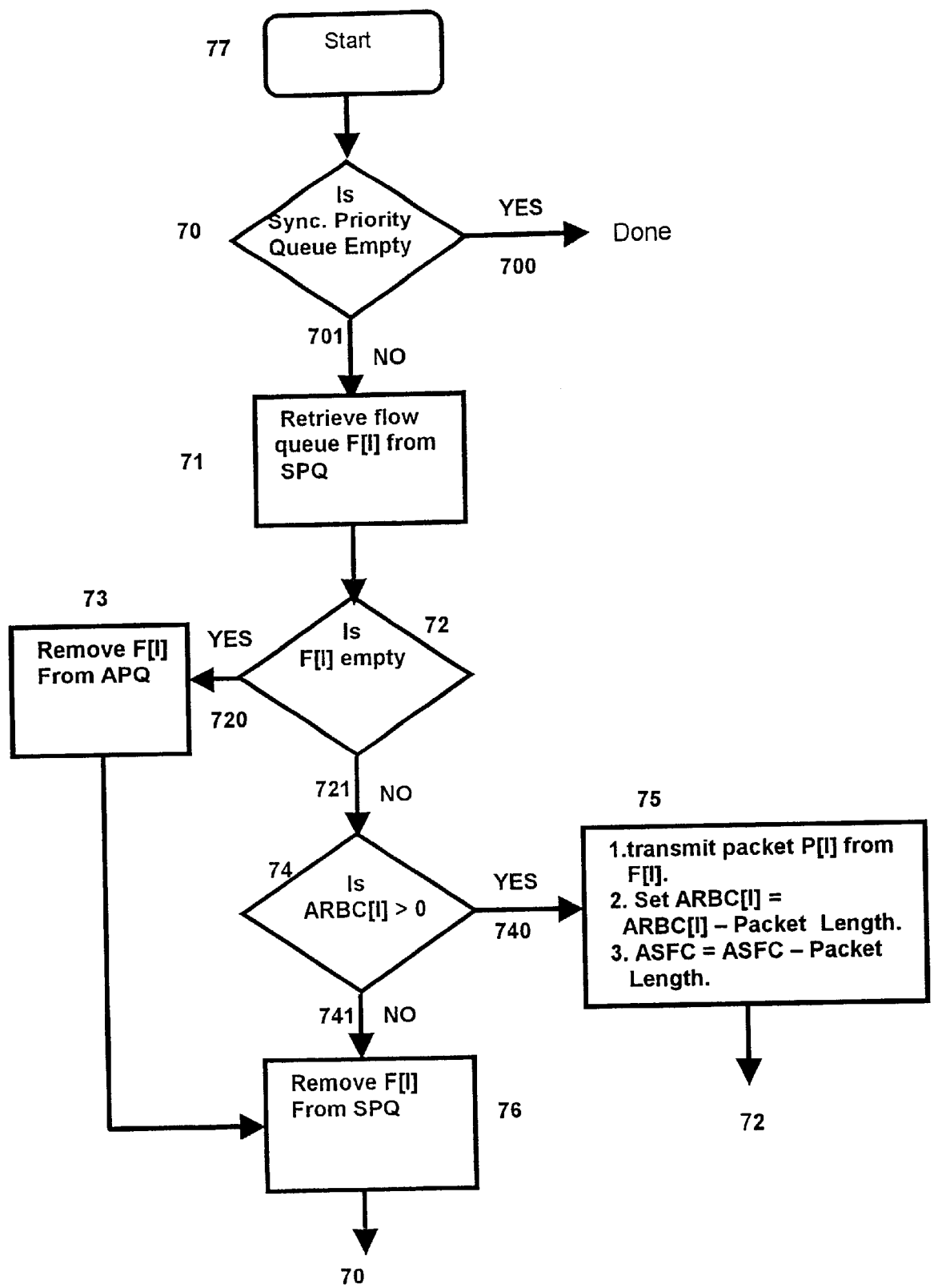
FIG. 7 illustrates the Synchronous Frame Access procedure.

FIG. 7 illustrates the Synchronous Frame Access procedure we have mentioned in FIG. 5. The Synchronous Frame access begins when SPQ becomes not empty and continues until all the backlogged flow queues in the SPQ are removed. In decision block 70, the fill level of SPQ is checked. If the SPQ is empty then the procedure is completed, line 700 leads to done. Otherwise, continue to block 71, where the flow queue, F[I], in the SPQ is processed. A decision block 72 checks if flow queue F[I] is empty. If F[I] is not empty, then follows line 721 to block 74, where F[I]'s ARBC is checked. If F[I]'s ARBC is positive, then following line 740 to block 75 where a packet in F[I], P[I] is transmitted. When a packet is transmitted from F[I], F[I]'s ARBC, ARBC[I], is subtracted the packet's equivalent bandwidth credit. The processing loop between 72 and 75 continues until either F[I] becomes empty or F[I]'s ARBC is no longer positive. During the looping, if decision block 72 find out the flow queue F[I] is empty, following line 720, F[I] is removed from APQ in block 73 and then removed from SPQ in block 76. If decision block 74 finds out that he flow queue's ARBC is not positive any more, follows line 741, F[I] is removed from SPQ in block 76. Done with block 76, control then goes back to decision block following line 70. The processing loop between 70 and 76 continues until SPQ becomes empty.

Figure 8:
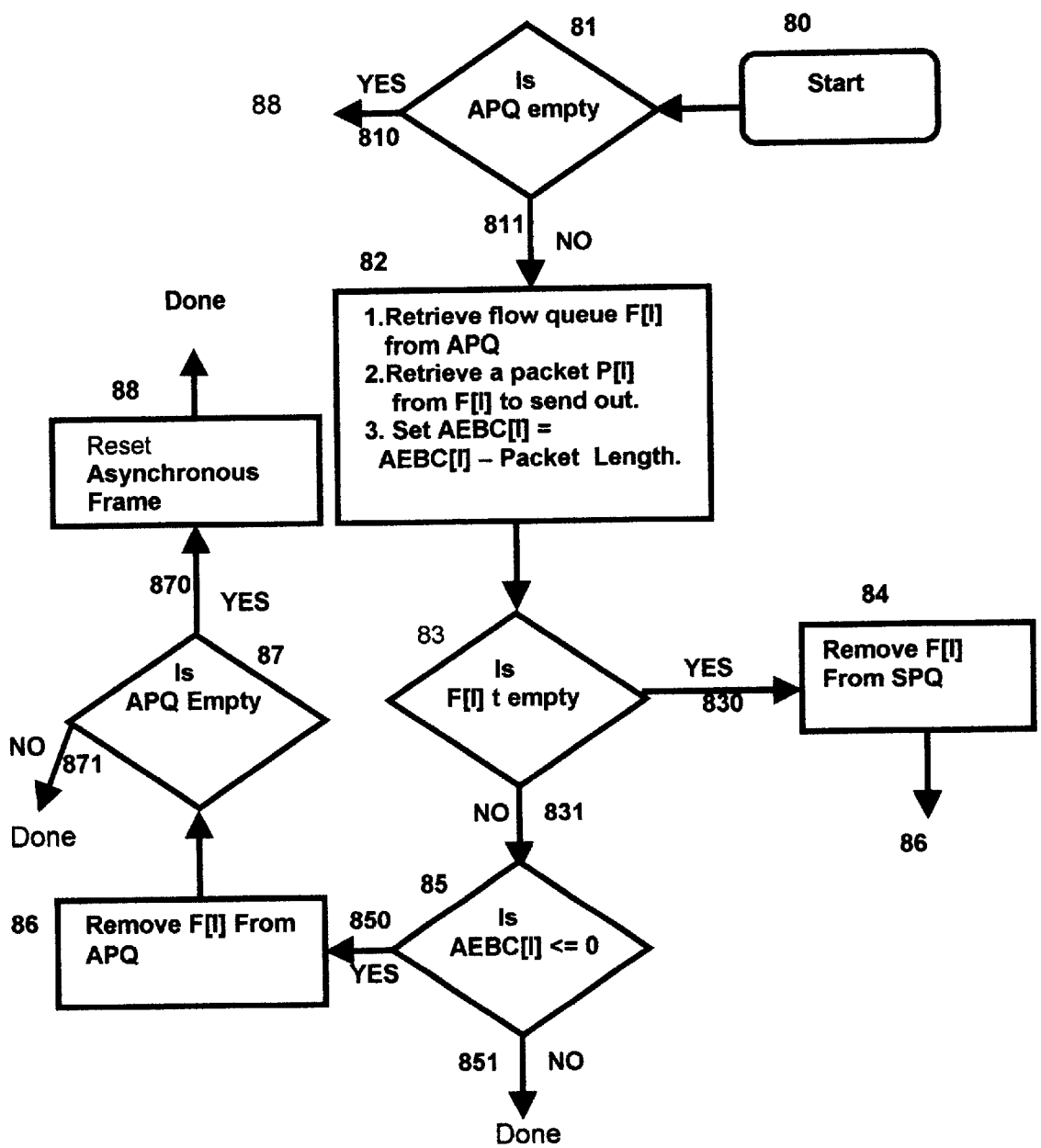
FIG. 8 illustrates the Asynchronous Frame Access procedure.

FIG. 8 illustrates the procedure for Asynchronous Frame Access. Unlike the Synchronous Frame, Asynchronous Frames are variable size frames. The beginning of the first Asynchronous Frame does not start until the Available Excess Bandwidth Resource is first accessed by a flow queue. In FIG. 8, decision block 81 checks to see if the APQ is empty. If so, then go to block 88 where Asynchronous Frame restart occurs. In the Asynchronous Frame restart procedure, all flow queues' AEBC are compensated up to their MEBC. After the compensation, all backlogged flow queues with positive AEBC are re-inserted back to the APQ. If the APQ is not empty, then go to block 82 where a packet is transmitted from the first flow queue, and the flow queue's AEBC is subtracted the equivalent credit of the packet. In decision block 83, a check to see if flow queue F[I] becomes empty. If flow queue is empty, follows line 830 to block 84 where F[I] is removed from both SPQ and then removed from APQ in block 86, so that it will not be scheduled until it becomes backlogged again. If the decision block 83 finds out that the flow queue is not empty, then go to a decision block 85 where the flow queue's AEBC is checked. If there is no Available Excess Bandwidth Credit left, then followings line 850, the flow queue is removed from the APQ. After the flow queue is removed from the APQ in block 86, a decision block 87 check to see if the APQ becomes empty, if not, we are done. If APQ is empty, the Asynchronous Frame Restart Procedure is taken in block 88. Asynchronous Frame Restart Procedure will be discussed in further detail in FIG. 9.

Figure 9:
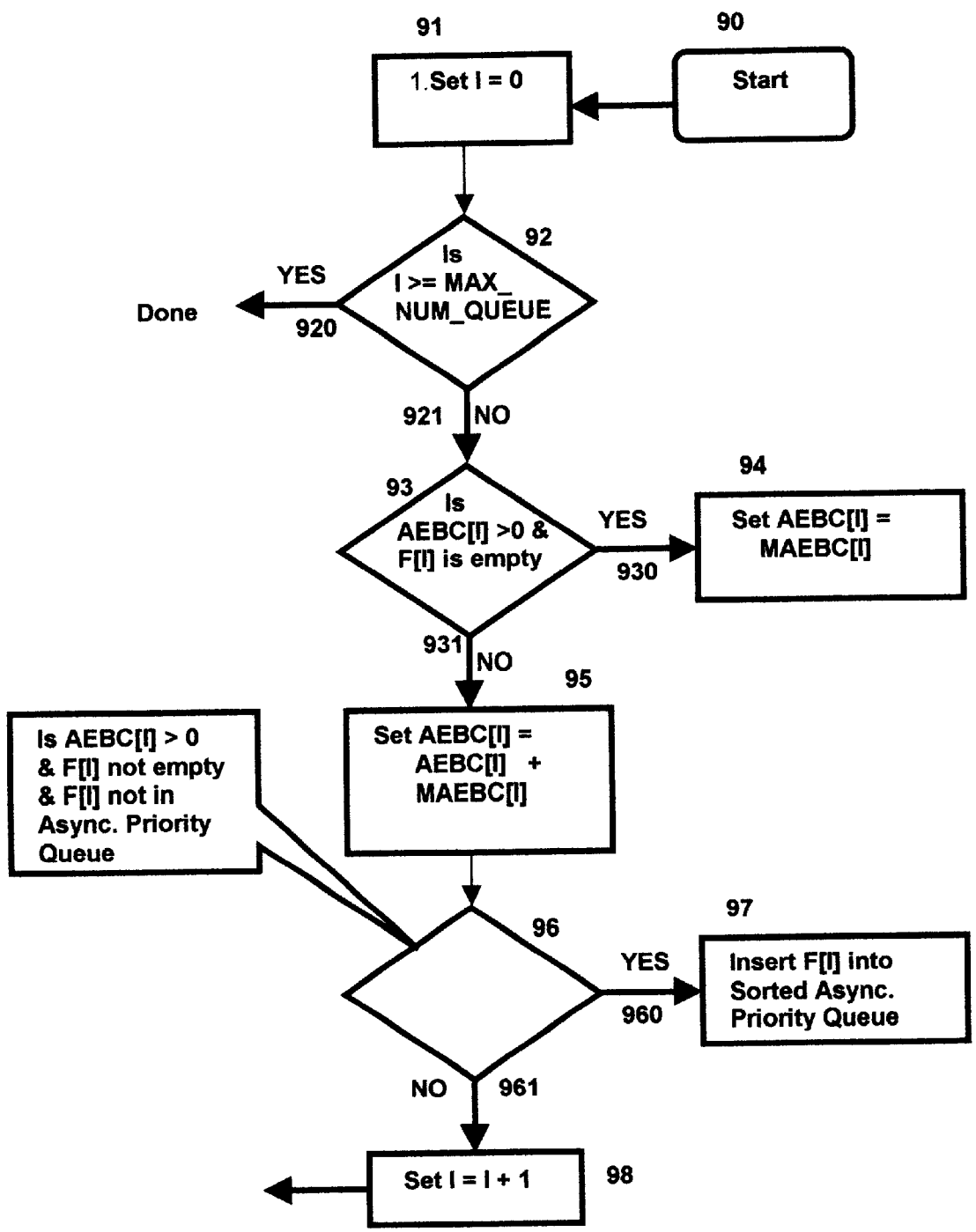
FIG. 9 illustrates the Asynchronous Frame restart procedure.

FIG. 9 illustrates the Asynchronous Frame Restart Procedure. This procedure adjusts every flow queue's AEBC, and possibly the APQ. An auxiliary variable, I, is introduced to indicate which flow queue is being processed. As a start, I is initialized to zero to begin with the first flow queue in block 91. The processing loop is controlled by block 92 which checks to see if the last flow queue has been processed, and block 98 which moves the processing to the next flow queue by incrementing I by 1. For each flow queue, the first step is a check in a decision block 93 made to see if the flow queue's AEBC is positive and if the flow queue is empty. If the answer is yes, which indicates that the flow queue has not used up its AEBC and is not backlogged at this time. In this case the flow queue's AEBC is reset to its MAEBC in block 94. Otherwise, the flow queue's AEBC is compensated with its MAEBC in block 95. After the compensation, check if the flow queue's AEBC becomes positive in block 96. If it is currently backlogged, and not in the APQ, follows line 960, it is inserted back to the APQ in block 97. Otherwise, I is incremented by 1 in block 98 for next queue to be processed.

The SPQ and APQ are both sorted priority queues. The priority queue consists of flow queues sorted in decreasing order of real-time priority. One way to implement the sorted priority queue is to use a double link list.

Figure 10:
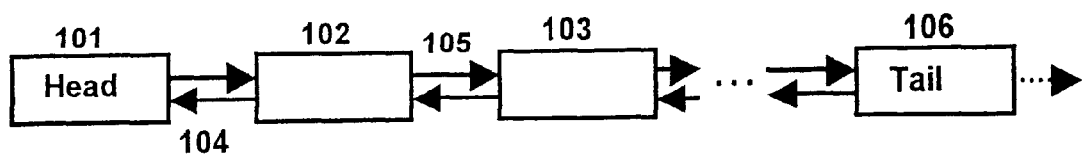
FIG. 10 illustrates the structure of a double link list.

FIG. 10 illustrates an implementation of double link list where each node, F[I] 102, in the list has a down-link 105 to its next neighbor and an up-link 104, to it previous member.

Figure 11:
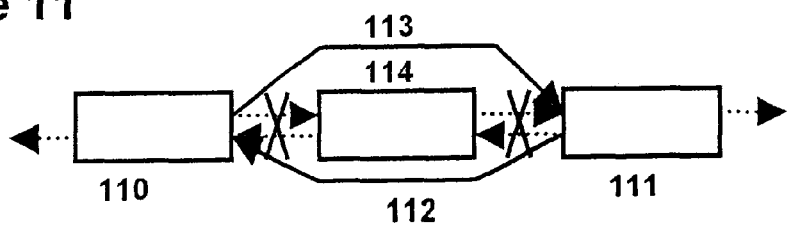
FIG. 11 illustrates removal of a node in the double link list.

As shown in FIG. 11, the flow queue 114 is removed from the list by adjusting its previous neighbor's down-link 113 to its next neighbor 111 and its next neighbor's up-link 112 to its previous neighbor 110.

Figure 12:
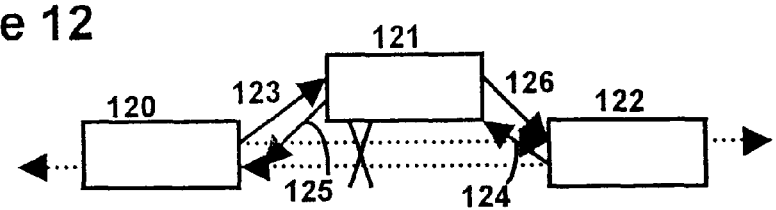
FIG. 12 illustrates the insertion of a node into the double link list.

FIG. 12 illustrates insertion of a node, where node 121 is inserted into the double link list by adjusting its next neighbor's up-link 124 to itself, its down-link 126 to its next neighbor, and its previous neighbor's down-link 123 to itself, its up-link 125 to its previous neighbor. If the flow queue is to be inserted at the head, then the inserted flow queue becomes the head. The double link list has a head 101 and a tail 106. If the flow queue is to be inserted at the tail, then the inserted flow queue becomes the tail.

Figure 13:
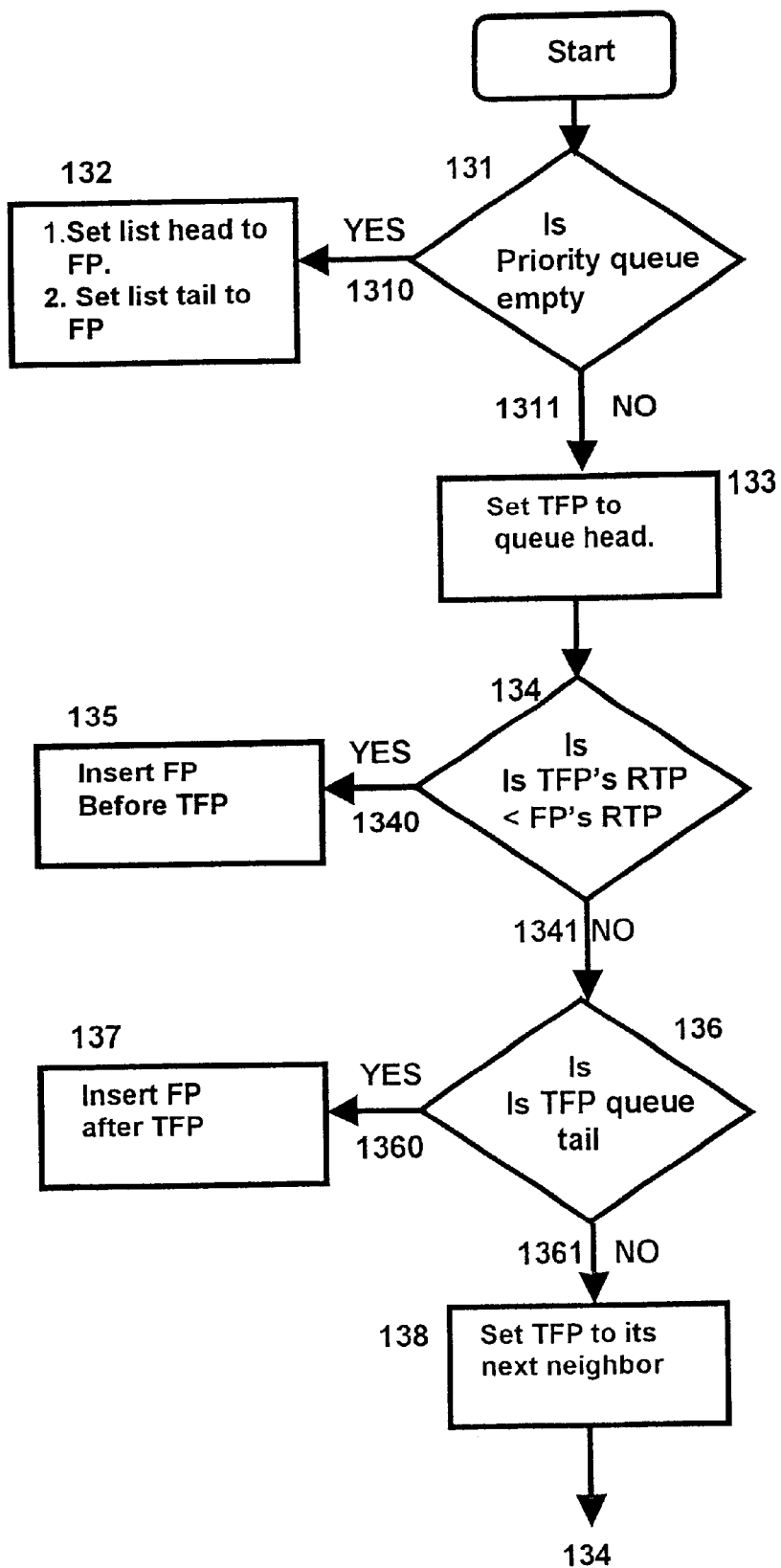
FIG. 13 illustrates the insertion of a flow queue into a sorted priority queue.
Figure 14:
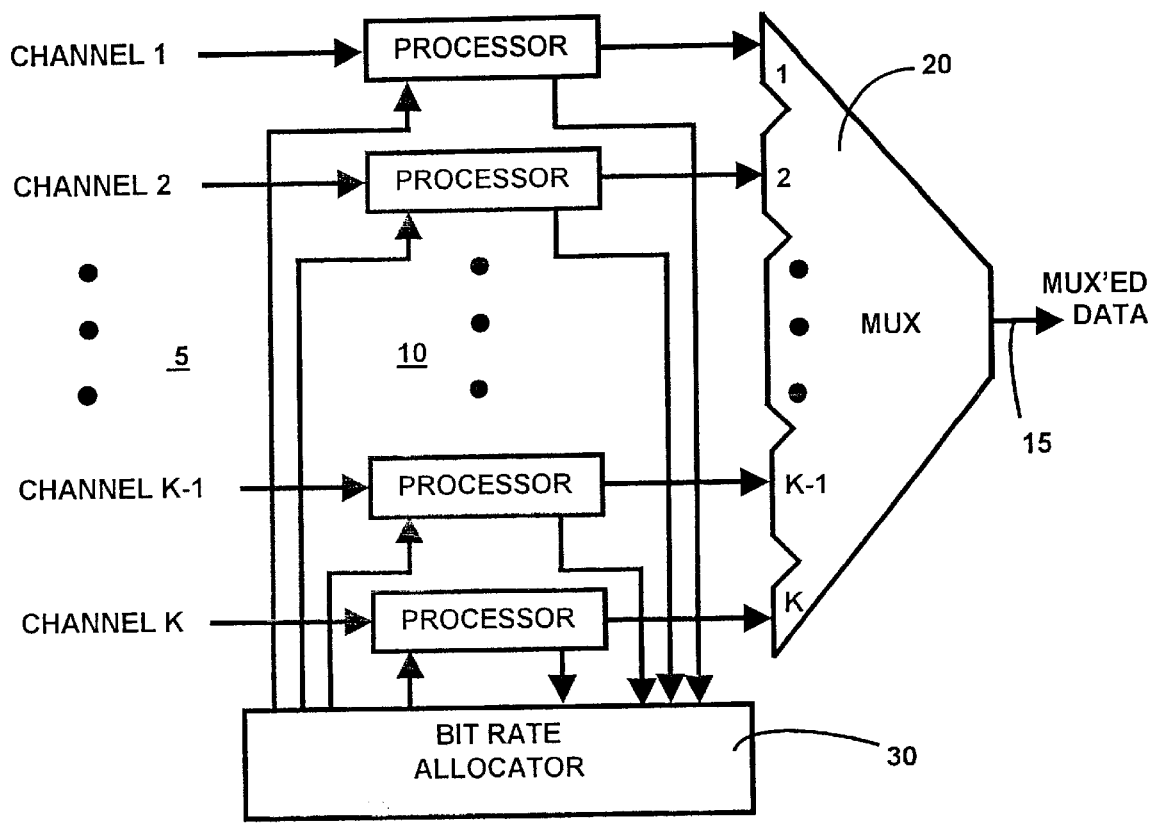
FIG. 14 illustrates the overview of a prior art.
Figure 15:
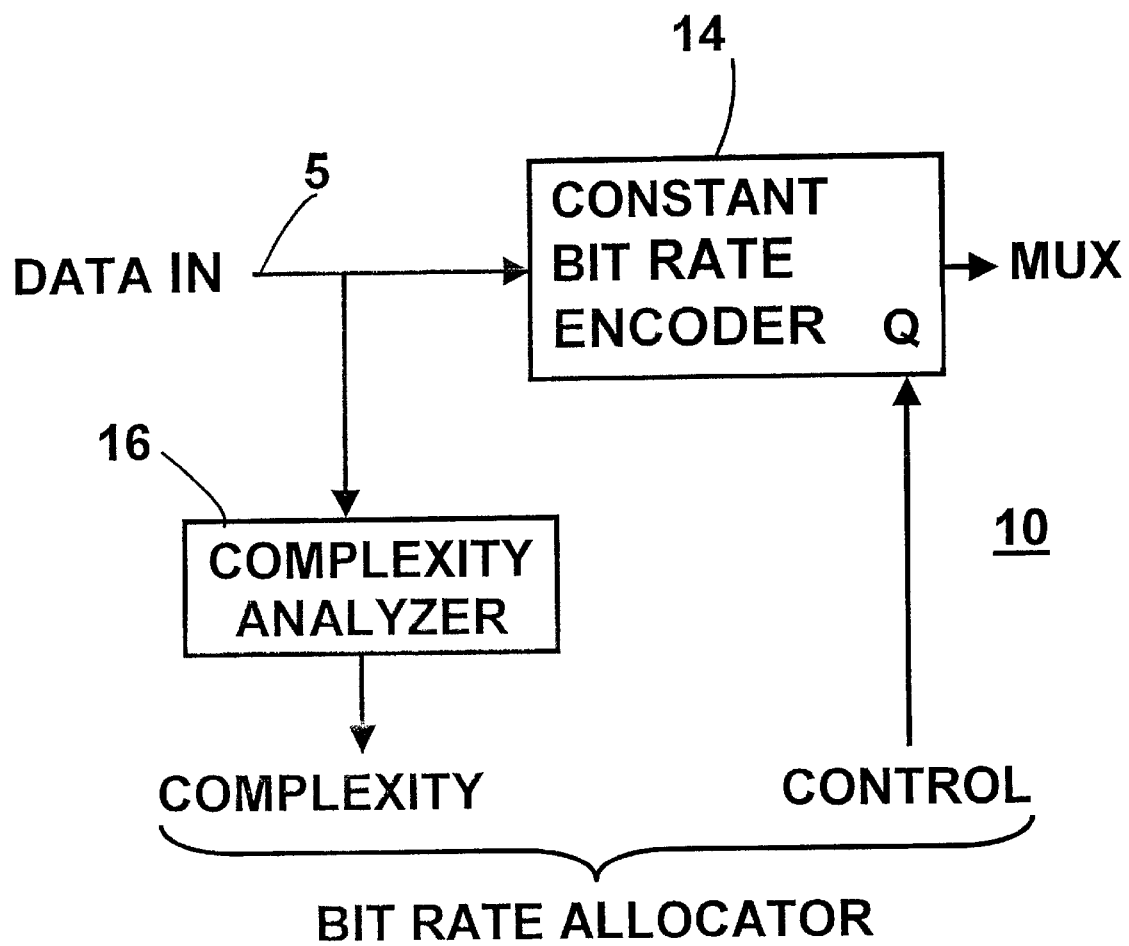
FIG. 15 illustrates the channel processor part of the prior art presented in FIG. 14.

FIG. 13 illustrates how a flow queue is inserted into a sorted priority queue. The operation is to find a location for the flow queue to be inserted in order to keep the priority queue to remain sorted after the flow queue is inserted to the priority queue. An auxiliary variable, TFP, is introduced to keep track of the current location in the priority queue. In a decision block 131, a check is done to see if the priority queue is empty. If so, follows line 1310, then the flow queue FP will be the only node in the priority queue, simply set the list head and list tail to FP in block 132. Otherwise, set TFP to queue head in block 133. In the search loop, a decision block 134 checks to see if TFP's real-time priority RTP is smaller than flow queue FP's real-time priority. If so, the location is found, follows line 1340, the flow queue is inserted in block 135 and the operation is completed. Otherwise follows 1341 to a decision block 136 to check if the end of the queue is reached. If it is at the end of the priority queue, follows 1360 to append FP to the end of the queue, set tail to the FP in block 137, and we are done. If TFP have not reached end of the queue 1361, then set TFP to it's next neighbor in block 138, and go back to decision block 134.

The uses of SPQ and APQ are to support real time priority for each traffic flow. An alternative design to support real time priority is to use a Priority Control Block, which is an array of entries indexed by the real time priority. Each entry in the array contains two first-in-first-out (FIFO) queues, the Synchronous Access Queue contains a list of backlogged flow queues with positive ARBC, and the Asynchronous Access Queue contains a list of backlogged flow queue with positive AEBC. A backlogged flow queue can only be put in the queues of the entry indexed by the flow queue's real timer priority. A bit mapped array can be used to keep track of which entry in the PCP contains non-empty queues. Since the Priority Control Block is implicitly sorted, the packet scheduler only needs to go to the entry corresponding to the location of the first bit in the bit mapped array that is set.

In conclusion, the above discussions illustrated the general approach the present invention adopted. In practice, this invention may derive different embodiments without departing from the scope defined by the ideas contended in the following claims.

What is claimed is:

1. A method for allocating reserved bandwidth to respective traffic flows in a packet scheduling system comprising a packet scheduler to meet Quality of Service requirements, comprising the steps of::

dividing a time domain into recurring fixed size of synchronous frames wherein each of the synchronous frames corresponds to a maximum sharable bandwidth;

assigning a maximum available reserved bandwidth credit (MARBC) to each respective flow queue such that the ratio between the MARBC of said flow queue and a maximum synchronous frame credit is the same as the ratio between said flow queue's share of reserved bandwidth and the maximum sharable bandwidth;

subtracting an amount of reserved bandwidth credit proportional to the size of a packet from said flow queue's available reserved bandwidth credit (ARBC) each time when the packet is transmitted from said flow queue using said flow queue's share of reserved bandwidth; and compensating each flow queue's ARBC up to the amount of said flow queue's MARBC as each of the Synchronous Frames restarts.

2. The method for allocating reserved bandwidth of claim 1 further comprises the step of controlling the synchronous frames employing a clock tic wherein the duration of each of the synchronous frames is associated with a maximum frame tic count derived from the size of the synchronous frame and transmission clock.

3. The method for allocating reserved bandwidth of claim 2 further comprises the step of invoking a clock tic routine periodically at each clock tic to increment and update the clock tic count so as to commence the synchronous frame restart procedure and reset the clock tic count back to zero when the clock tic count reaches the maximum frame tic count.

4. The method for allocating reserved bandwidth of claim 3 further comprises the step of using a Synchronous Priority Queue (SPQ) to provide for a double link list of flow queues sorted in decreasing order of real time priority.

5. The method for allocating reserved bandwidth of claim 4 further comprises the step of inserting a flow queue into said SPQ in a packet scheduler, which comprises the following steps:

verifying that the flow queue has a positive ARBC and becomes backlogged;

verifying that the flow queue is not empty and the ARBC of the flow queue become positive when each synchronous frame restarts;

removing packets out of the flow queue in said SPQ and adjusting the ARBC of the flow queue by the packet scheduler; and removing the flow queue out from said SPQ by the packet scheduler when either the fill level of said flow queue changes from not empty to empty or the ARBC of said flow queue becomes zero or negative.

6. The method for allocating reserved bandwidth of claim 2 further comprises the steps of incorporating a plurality of Synchronous Frame Access Queue (SFAQ), which is a FIFO queue of flow queues, associated with respective real time priority, comprising adding a flow queue with a positive ARBC by the packet scheduler to the associated SFAQ when said flow queue becomes backlogged;

removing a flow queue from its SFAQ queue by the packet scheduler when said flow queue either becomes empty or exhausted its ARBC; and selecting the non-empty SFAQ with the highest real time priority for process.

7. The method for allocating reserved bandwidth of claim 1 further comprises a means to allocate excess bandwidth to respective traffic flows, comprising the steps of:

forming Asynchronous Frames by concatenating discrete portions of zero, one, or more Synchronous Frame such that its size varies from zero to the size of a Synchronous Frame;

employing Asynchronous Frames to allocate excess bandwidth to the backlogged flow queue with available excess bandwidth.

assigning each flow queue with a maximum available excess bandwidth credit (MAEBC) for sharing the excess bandwidth wherein the MAEBC is derived from a weighting factor assigned to said flow queue and a maximum synchronous frame credit such that the summation of MAEBCs for all traffic flows dose not exceed the maximum synchronous frame credit.

subtracting an amount of excess bandwidth credit proportional to the size of a packet from the AEBC of said flow queue each time when the packet is transmitted from a flow queue while the available reserved bandwidth credit (ARBC) of said flow queue is negative or zero;

restarting Asynchronous Frame when there is no backlogged flow queue with positive AEBC; and compensating each flow queue up to the amount of the MAEBC of said flow queue at each restart of the Asynchronous Frame.

8. The method for allocating reserved bandwidth of claim 7 further comprises the step of providing an asynchronous priority queue (APQL, which comprising:

inserting into said APQ a backlogged flow queue by a packet scheduler when its AEBC becomes positive when an Asynchronous Frame restarts such that all backlogged flow queues in said APQ remain sorted in a decreasing order of real time priority;

taking a packet out from a first flow queues in said APQ when no backlogged flow queue has a positive ARBC and adjusting the AEBC of said flow queue by the packet scheduler;

removing a flow queue from said APQ when either said flow queue becomes empty or the AEBC of said flow queue becomes zero or negative.

9. The method for allocating reserved bandwidth of claim 7 further comprises the step of providing a plurality of Asynchronouspme Frame Access Queue (AFAQ), which is a FIFO queue of flow queues, associated with respective real time priority, comprising:

adding a flow queue with positive AEBC to the associated AFAQ when said flow queue becomes backlogged;

removing a flow queue from its AFAQ queue when a flow queue either becomes empty or exhausted its ARBC; and selecting the non-empty AFAQ with the highest real time priority for process.

10. The method for allocating reserved bandwidth of claim 7 wherein the reserved bandwidth allocation is always executed whenever there is a backlogged flow queue with positive ARBC while the excess bandwidth allocation is executed only when there is no backlogged flow queue with positive ARBC by the packet scheduler.

11. A packet scheduling subsystem, being part of a packet based multiplexing device for dynamically allocating bandwidth to packet flows, comprising:

an output line to provide exit to said packet flows that have been rate controlled by the packet scheduling subsystem wherein the output line is provided with-a maximum bandwidth utilization level sharable among said packet flows;

bandwidth credits being employed by the packet scheduling subsystem for calculating bandwidth consumption of a packet flow;

a plurality of flow queues being parallel arranged to temporarily stored packets-that have been previously classified such that packets belonging to the same traffic flow are stored in the same flow queue and each of said flow queues having a set of QoS parameters further comprising a Guaranteed Reserved Bandwidth, an Excess Bandwidth and a Real-Time Priority with each of said Guaranteed Reserved Bandwidth and Excess Bandwidth calculated in terms of said bandwidth credits;

a set of parallel arranged Asynchronous Priority Queue (APQ) and Synchronous Priority Queue (SPQ) wherein each of said APQ and said SPQ further comprising a plurality of backlogged flow queues wherein said backlogged flow queues are sequentially arranged in order of descending real-time priority whereby the packet scheduling subsystem selects said backlogged flow queues from either of said APQ and said SPQ and sends the selected backlogged flow queues to said output line; and a packet scheduler comprising a packet scheduling control means to transmit packets from said backlogged flow queues maintained in said APQ and SPQ;

whereby the packet scheduling subsystem shapes the traffic on said output line such that the QoS requirements for each individual traffic flow are met.

* * * * *